United States Patent
Metzen et al.

[11] Patent Number: 6,035,978
[45] Date of Patent: Mar. 14, 2000

[54] BRAKE DISK

[75] Inventors: Hans-Peter Metzen, Bad Homburg; Jürgen Bauer, Wiesbaden, both of Germany

[73] Assignee: ITT Manufacturing Enterprises, Inc., Wilmington, Del.

[21] Appl. No.: 08/952,718

[22] PCT Filed: Jun. 8, 1995

[86] PCT No.: PCT/EP95/02221

§ 371 Date: Feb. 9, 1998

§ 102(e) Date: Feb. 9, 1998

[87] PCT Pub. No.: WO96/41968

PCT Pub. Date: Dec. 27, 1996

[30] Foreign Application Priority Data

Jun. 6, 1994 [DE] Germany .............................. P4419757

[51] Int. Cl.⁷ .................................................... F16D 65/12
[52] U.S. Cl. .................................. 188/218 XL; 188/73.2; 188/264 AA
[58] Field of Search ............................ 188/218 XL, 73.2, 188/264 AA, 264 A, 71.6, 218 R, 250 G, 250 B, 18 A, 18 R, 218 A, 58, 59, 18, 17, 70 R; 192/107 M, 70.19, 70.2, 113.2, 113.23; 301/105.1, 6.1–6.8; 403/348, 405.1, 13; 29/513

[56] References Cited

U.S. PATENT DOCUMENTS 2,926,760  3/1960  Lucien .
5,299,667  4/1994  Hammond ........................ 188/218 XL
5,520,269  5/1996  Yamamoto et al. .............. 188/218 XL

FOREIGN PATENT DOCUMENTS 12 47 767   8/1967   Germany .
20 13 535  10/1970   Germany .
44 19 757  12/1995   Germany .
 1528114   10/1978   United Kingdom ............ 188/218 XL

OTHER PUBLICATIONS

Search Report of the German Patent Office Relating to Related German Patent Application No. 44 19 757.8

*Primary Examiner*—Douglas C. Butler
*Attorney, Agent, or Firm*—Rader, Fishman & Grauer PLLC

[57] ABSTRACT

A multi-part brake disk consists of a friction ring and a bowl-shaped holding part formed from sheet metal and connected in a form-fitting manner to the friction ring by plastic deformation. To ensure an especially simple and inexpensive connection, the holding part is provided with stamped tabs that are distributed over its circumference and project radially outward out of the peripheral face and can be shaped in the holding part by a simple stamping operation directed radially outward.

10 Claims, 5 Drawing Sheets

Fig. 5
Fig. 6
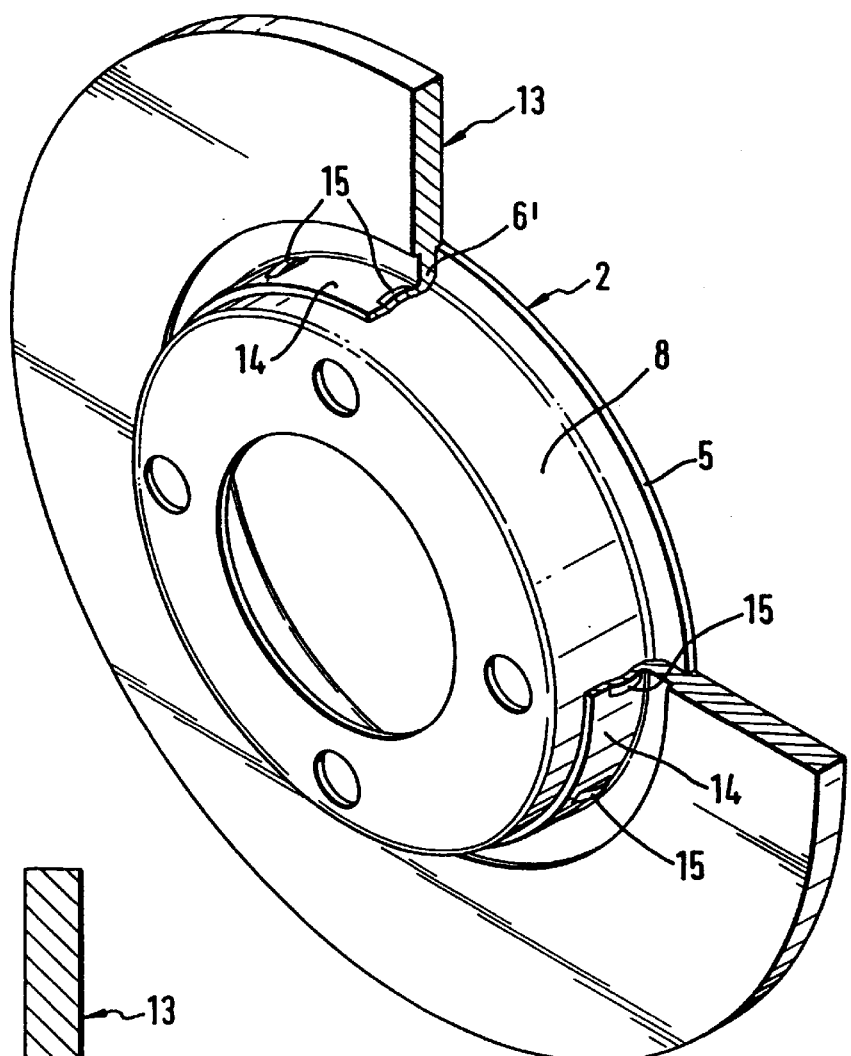
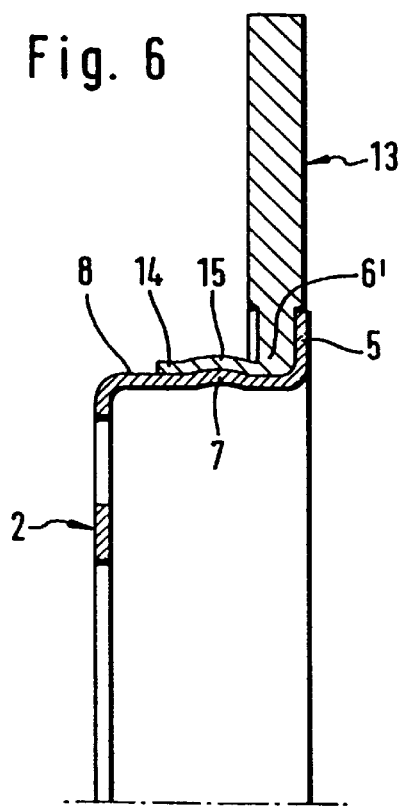

BRAKE DISK

BACKGROUND OF THE INVENTION

The invention relates to a brake disk composed of several parts for a disk brake.

A generic brake disk is known from German Patent No. 2,013,535. With the known brake disk, a friction ring of a cast material is connected to a bowl-shaped holding part made of sheet metal. The holding part is fastened with screws to the hub of a vehicle wheel and supports the friction ring. Such composite brake disks have the advantage that the holding part can be made thinner and lighter than in a one-part brake disk, which is cast as a whole. Furthermore, no deleterious distortion of the friction ring occurs with generic two-part brake disks under the influence of high temperatures, because the holding part can absorb heat-induced deformation due to its elasticity. However, the known brake disk still requires a considerable manufacturing expense because the plastic deformation required for a form-fitting connection of the holding part to the friction ring cannot be achieved in a single simple operation. Instead, several operations are required to establish the connection. This makes the manufacturing process more expensive.

The object of the invention is to improve a generic brake disk to the extent that the manufacturing complexity and the related manufacturing costs required for connecting the friction ring and the holding part can be reduced.

SUMMARY OF THE INVENTION

This object is achieved by providing stamped tabs distributed around the circumference of the holding part; they can be produced by a simple movement of the stamping tool directed radially from the inside to the outside using a stamping tool that acts from the inside.

In contrast to that, a manufacturing process consisting of several operations is required with the known brake disc according to German Patent No. 2,013,535, because first the edge of the bowl-shaped holding part must be subdivided into numerous sections which must then be bent in the axial direction to reliably grip an inside edge of the friction ring. Apart from this, a shoulder in the edge area of the holding part is required for the type of attachment described here, so the friction ring can rest against it when it is clamped. The alternative method of attachment by welding as proposed in the aforementioned document is also more complicated and more expensive than that according to the present invention.

The joining technique according to this invention thus has the advantage that it can be carried out especially easily and inexpensively in one operation, without any need for refinishing the finished brake disk. In addition to the above-mentioned weight reduction and dimensional stability of the friction ring under the influence of temperature, however, there are also additional advantages of this invention. Thus, it is possible to use different materials for the friction ring and the holding part without any additional expense. For example, the friction ring or the holding part may be made of aluminum. In addition, an especially simple shape without any undercuts can be selected for the holding part, thus permitting simple and inexpensive manufacture of the raw holding part, especially in a single stamping operation. The stamping according to this invention for attaching the friction ring is shaped only when the holding part is joined to the friction ring. Thus, no additional preparatory steps are required. Finally, a worn brake disk can easily be broken down into its parts to permit separate recycling of the materials of the friction ring and the holding part.

In a preferred embodiment, the holding part is bent at its outer edge, forming a peripheral flange that projects radially. The radially inside edge area of the friction ring may be in contact with this flange of the holding part in one axial direction, so that the stamped tabs need only prevent the friction ring from sliding away from the holding part in the other axial direction in a form-fitting manner. The stamped tabs are arranged at a distance from the flange and are cam-like in design, thus resulting in an inclined flank which rises in the area of an inside edge of the friction ring and is in contact with the edge, preventing displacement of the friction ring in the other axial direction while at the same time ensuring a tight and tolerance-free but nevertheless elastic connection between the holding part and the friction ring.

In a refinement of the invention according to the first embodiment, one or more securing noses projecting radially outward may also be provided, with these noses engaging in a respective recess in the friction ring so they prevent the friction ring from twisting on the holding part due to the form-fitting connection. This measure ensures that the high torques which occur in emergency braking can be transmitted without endangering the strength of the joint.

In a second embodiment of the invention, the holding part is in turn provided with a peripheral flange that projects radially in its end area so that the radially inside edge area of the friction ring rests against it and secures it against displacement in one axial direction. In addition, however, the radially inside edge area of the friction ring develops into a peripheral collar that projects in the axial direction, i.e., it is arranged essentially at a right angle to the friction surface of the friction ring. This collar comprises the outer peripheral surface of the holding part with which it is in contact. The holding part and the friction ring are joined in principle in the same way as in the first embodiment, in that stamped tabs are formed radially from the inside to the outside in the holding part and engage in respective stamped recesses in the collar of the friction ring in a form-fitting manner. This results in a frictionally engaged and positively engaged connection. Preferably the stamped recesses in the collar of the friction ring can be shaped at the same time as the stamped tabs of the holding part.

In another embodiment of this invention, the stamped tabs of the holding part are designed in a crater shape. They engage in preferably round recesses in the radially inside edge area of the friction ring, thus yielding a secure form fit in the axial direction as well as a secure transmission of high torques in the peripheral direction. In this embodiment, it is expedient if the friction ring is provided with feet that project radially inward and are arranged at equal intervals in the circumferential direction; boreholes for engaging the stamped tabs of the holding part are provided in these feet.

With the ventilated brake disk, the friction ring is provided with hollow spaces for the passage of cooling air. When using such a friction ring, another advantageous embodiment of the invention is recommended, where the stamped tabs of the holding part engage in the hollow spaces of the friction ring. Especially with the conventional embodiments of such friction rings having two partial rings that are connected to each other by radial webs, this embodiment is especially expedient because the stamped tabs in the holding part can engage in a form-fitting manner between two webs each with respect to the direction of rotation and they can be clamped between two friction ring halves in a form-fitting manner with respect to the axial direction. In this case, a peripheral radially projecting flange on the holding part as provided in the first embodiment described above may be eliminated in principle, but such a flange is recommended to ensure even more stable contact with the friction ring.

Embodiments of this invention are explained in greater detail below on the basis of the figures.

BRIEF DESCRIPTION OF THE DRAWINGS

In the drawings,

FIG. 5 shows a partial cut-away perspective view of a brake disk according to this invention in a second embodiment;

FIG. 6 shows a radial section in the area of the stamped tab in the brake disk from FIG. 5;

DETAILED DESCRIPTION OF THE DRAWINGS

Figure 1:
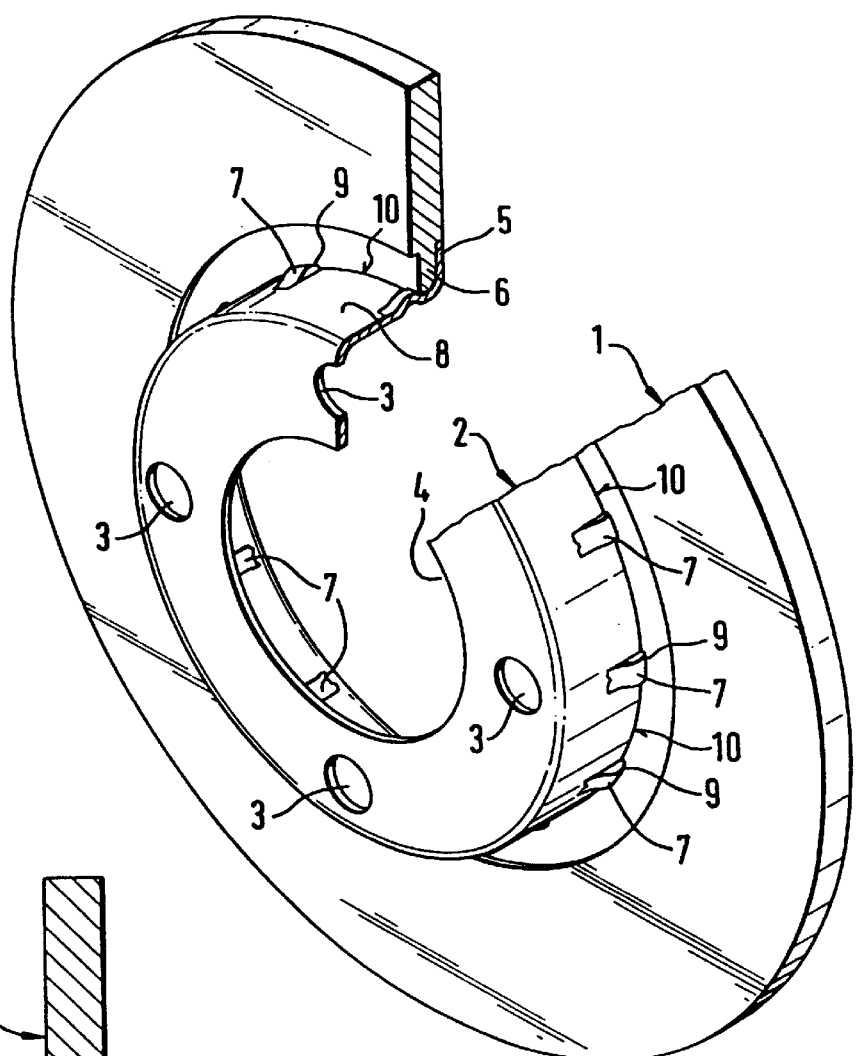
FIG. 1 shows a partial cut-away perspective view of a brake disk according to this invention.
Figure 2:
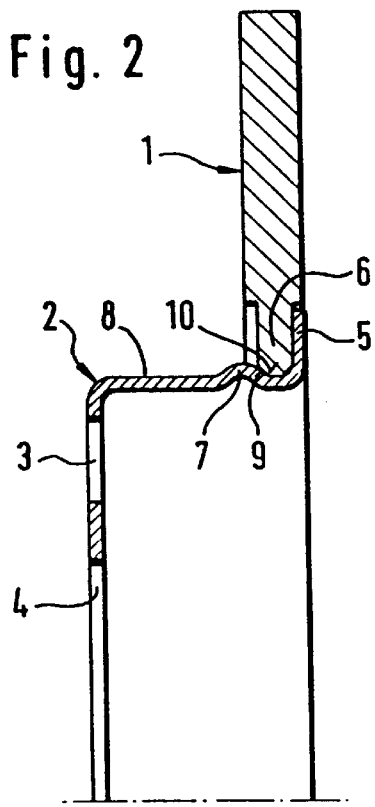
FIG. 2 shows a radial section through the brake disk from FIG. 1 in the area of a stamped tabs.

The brake disk illustrated in FIG. 1 consists of a cast friction ring 1 and a bowl-shaped holding part 2 formed from sheet metal provided with mounting holes 3 for attaching to a wheel hub and a central passage 4 for the wheel hub to pass through. Holding part 2 is bent over in its outer end area, forming a peripheral flange 5 that projects radially outward. The radial inside edge area 6 of friction ring 1 is in contact with flange 5 and secures friction ring 1 against displacement in one axial direction on the holding part 2. Holding part 2 has a number of stamped tabs 7 that are distributed uniformly over its circumference and project radially out of the peripheral face 8 and are arranged at an axial distance from flange 5. Stamped tabs 7 are cam-shaped and their one inclined flank 9 is in contact with an inside edge 10 of friction ring 1 to prevent displacement of friction ring 1 in the other axial direction.

To assemble the brake disk, friction ring 1 is pushed onto holding part 2 until it is in contact with flange 5. Next the stamped tabs 7 are created by a stamping tool that is inserted into the interior of the bowl-shaped holding part 2 in a simple stamping operation directed radially from the inside to the outside. At the same time, friction ring 1 is attached to holding part 2.

Figure 3:
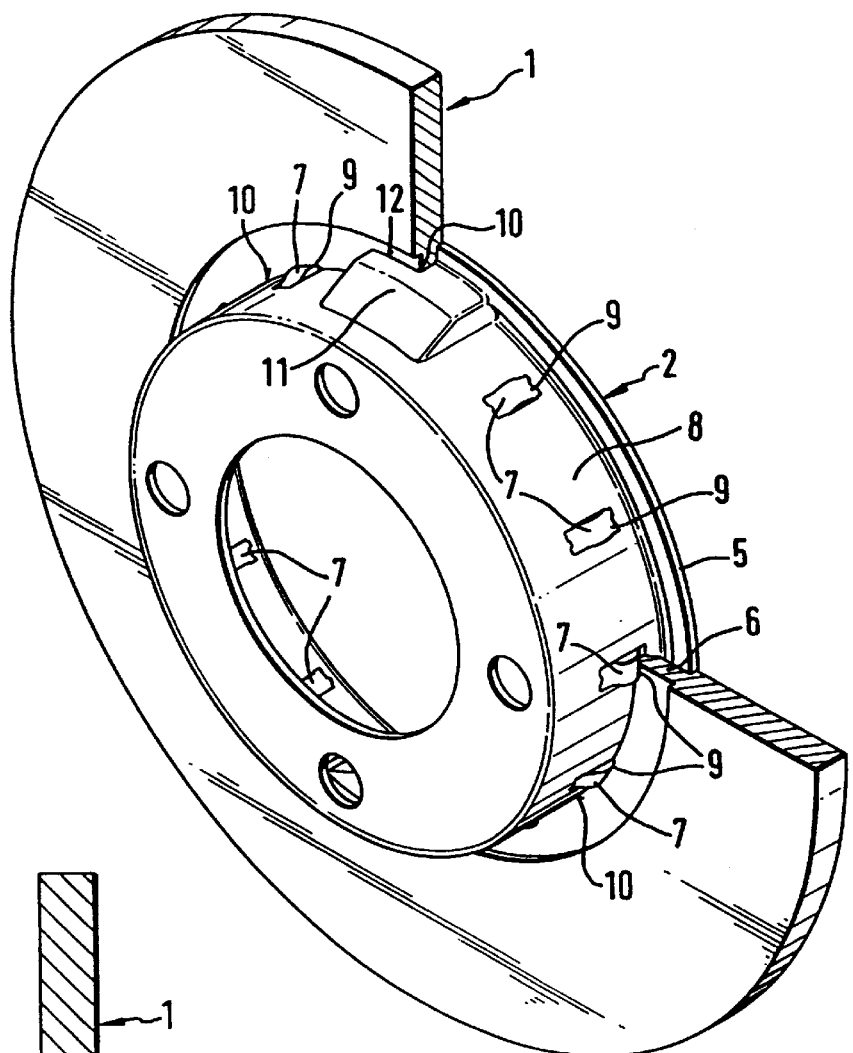
FIG. 3 shows a view through the brake disk from FIG. 1 with an additional securing nose.
Figure 4:
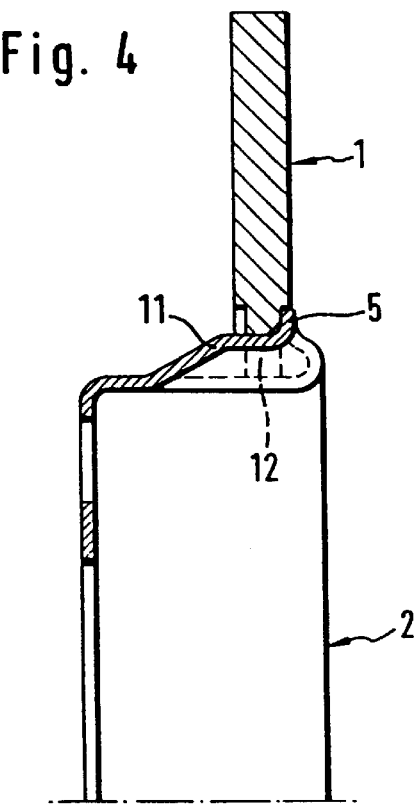
FIG. 4 shows a radial section through the brake disk from FIG. 3 in the area of the securing nose.
Figure 7:
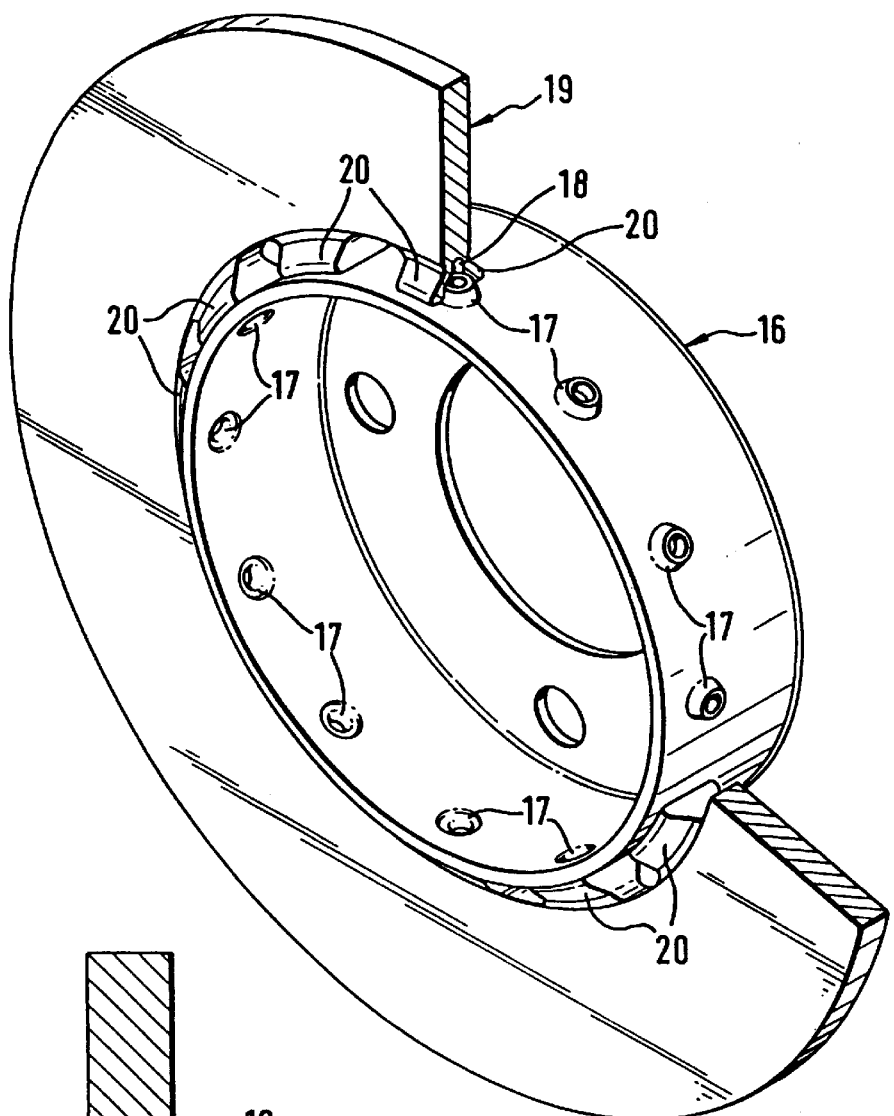
FIG. 7 shows a partial cut-away perspective view of a third embodiment of a brake disk according to this invention.
Figure 8:
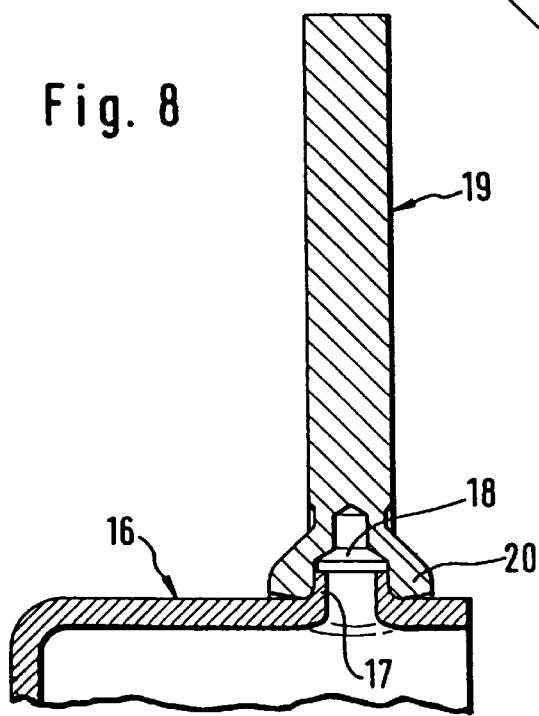
FIG. 8 shows a section through the brake disk from FIG. 7 in the area of the stamped tab.

The variant of the brake disk illustrated in FIG. 3 also has a securing nose 11 which also projects radially outward out of the peripheral face 9 of holding part 2. Securing nose 11 engages in recess 12 of friction ring 1, thus creating a form-fitting connection in the peripheral direction (direction of rotation) and to permit transmission of high torques.

In the embodiment illustrated in FIG. 5, holding part 2 corresponds essentially to the first embodiment, while friction ring 13 is also provided with a peripheral collar 14 that projects outward in the radial direction and is in contact with the peripheral face 8 of holding part 2. Stamped tabs 7 of holding part 2 (FIG. 6) engage in the respective stamped recesses 15 of collar 14 in a form-fitting connection.

In another embodiment, a modified holding part 16 is provided with stamped crater-shaped recesses 17 that engage in a form-fitting manner in round recesses 18 which are formed in the radially inside edge area of the modified friction ring 19. The radial inside edge area of friction ring 19 is provided with feet 20 that project radially inward and are distributed at uniform intervals over the friction ring 19 and are each provided with a recess 18.

Figure 9:
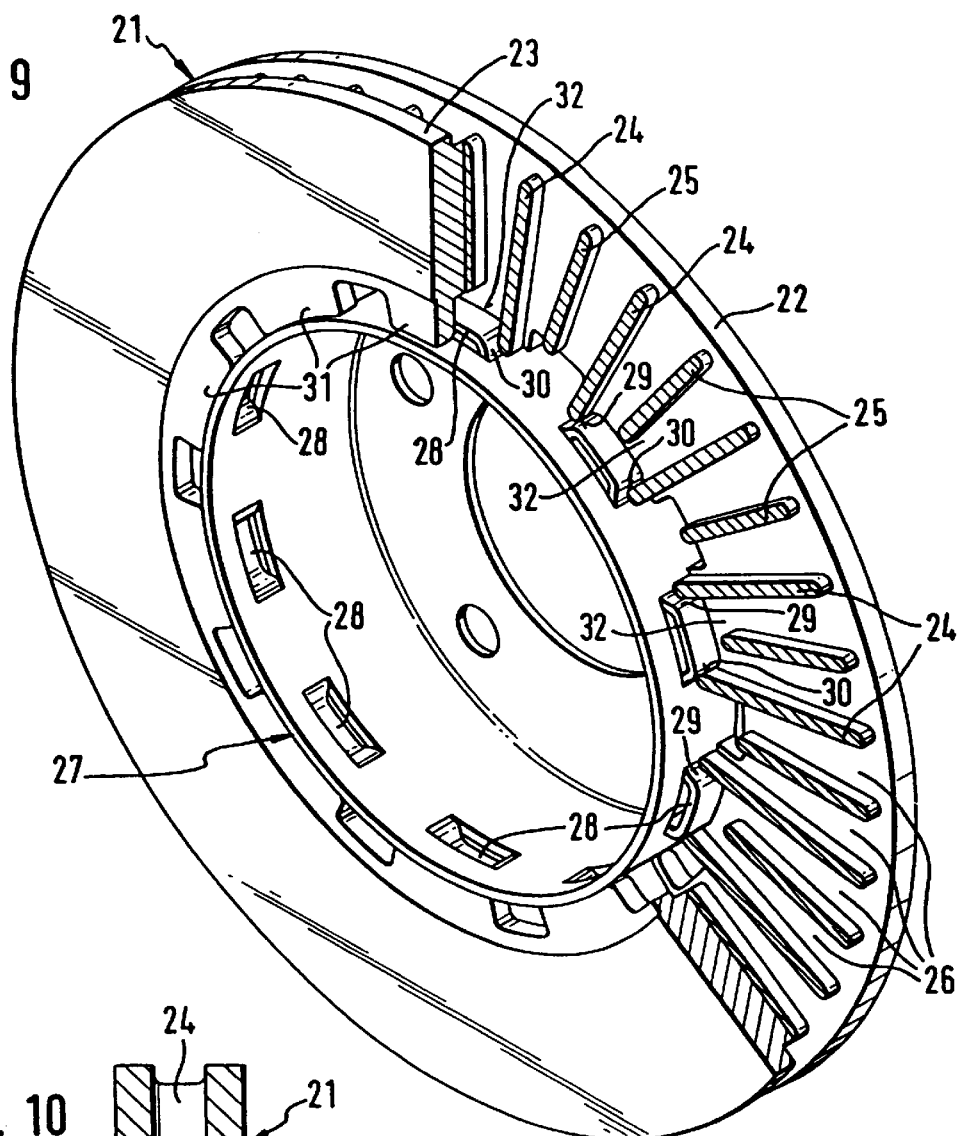
FIG. 9 shows a partial cut-away perspective view of a fourth embodiment of a brake disk according to this invention.

In the embodiment illustrated in FIG. 9, the modified friction ring 21 consists of two component rings 22, 23 joined by webs 24, 25. Between webs 24, 25 there are hollow spaces 26 for the passage of cooling air. A modified holding part 27 is in turn provided with recesses 28 that are preferably designed like cams, but are aligned in the circumferential direction here. Stamped tabs 28 engage in hollow spaces 26 and are in contact at their flanks 29, 30 with the webs 24 in a form-fitting manner with respect to the direction of rotation. Stamped tabs 28 are also connected to opposing wall sections 31, 32 of component rings 22, 23 in a form-fitting connection with regard to the axial direction.

Figure 10:
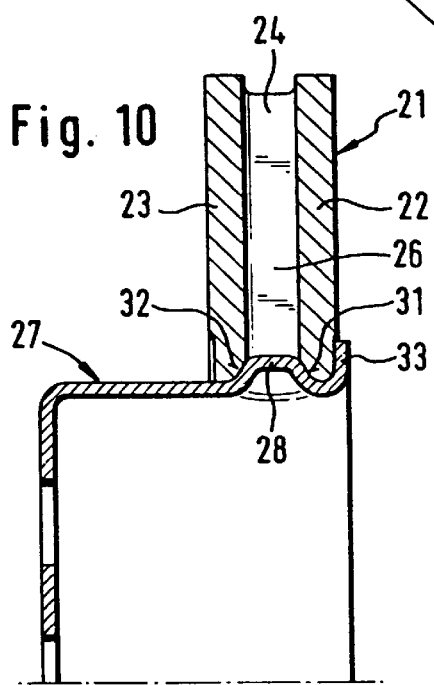
FIG. 10 shows a radial section through the brake disk like that from FIG. 9 in another variant.

Finally, as also shown in FIG. 10, the modified holding part may also be provided with a peripheral flange 33 that projects radially for axial contact with friction ring 21.

What is claimed is:

1. A brake disk having a rotary axis and comprising
   a friction ring and a bowl-shaped holding part,
   the holding part having a circumferential face and being provided with stamped tabs that are
      adapted to be shaped in the holding part by a stamping directed radially outward, to thereby project radially outward out of the circumferential face,
      distributed over the circumference of the holding part, and
      connected to the friction ring in a positive-locking manner.

2. The brake disk according to claim 1, wherein a radial inside edge area of the friction ring is provided with radial recesses, whereas stamped tabs in the holding part are designed as crater-shaped areas that engage in the radial recesses.

3. The brake disk according to claim 1, wherein the friction ring is provided with hollow spaces for the passage of cooling air, and the stamped tabs in the holding part engage in the hollow spaces.

4. The brake disk according to claim 3, wherein the hollow spaces are separated by webs, and the stamped tabs engage between two webs each in a positive-locking manner with respect to the circumferential direction.

5. The brake disk according to claim 4, wherein the stamped tabs are connected in a positive-locking manner, with respect to the axial direction, to the opposing wall sections of the friction ring.

6. The brake disk according to claim 3, wherein the holding part is provided on its outer end area with a peripheral flange that projects radially outward for axial contact with the friction ring.

7. A brake disk having a rotary axis and comprising
   a friction ring and a bowl-shaped holding part,
   the holding part having a circumferential face and being provided with stamped tabs that are
      adapted to be shaped in the holding part by a stamping directed radially outward, to thereby project radially outward out of the circumferential face, distributed over the circumference of the holding part, and connected to the friction ring in a positive-locking manner, wherein the holding part comprises an outer edge area with a radially projecting peripheral flange, a radial inside edge area of the friction ring abutting the peripheral flange and being secured to prevent displacement in one axial direction, the stamped tabs being arranged at an axial distance from the flange and designed in a cam shape, so that an inclined flank of a stamped tab that rises in the area of an inside edge of the friction ring and is in contact with the inside edge prevents displacement of the friction ring in the other axial direction.

8. The brake disk according to claim 7, wherein the friction ring is provided with hollow spaces for the passage of cooling air, and the stamped tabs in the holding part engage in the hollow spaces.

9. The brake disk according to claim 8, wherein the hollow spaces are separated by webs, and the stamped tabs engage between two webs each in a positive-locking manner with respect to the circumferential direction.

10. The brake disk according to claim 9, wherein the stamped tabs are connected in a positive-locking manner, with respect to the axial direction, to the opposing wall sections of the friction ring.

* * * * *